US010817888B2

(12) United States Patent
Spears et al.

(10) Patent No.: US 10,817,888 B2
(45) Date of Patent: *Oct. 27, 2020

(54) SYSTEM AND METHOD FOR BUSINESSES TO COLLECT PERSONALITY INFORMATION FROM THEIR CUSTOMERS

(71) Applicant: Woofound, Inc., Middle Rover, MD (US)

(72) Inventors: Joshua Spears, Baltimore, MD (US); Daniel Sines, Middle River, MD (US); Carson Wright, Baltimore, MD (US); Noreen Honeycutt, Baltimore, MD (US)

(73) Assignee: Woofound, Inc., Baltimore, MD (US)

( * ) Notice: Subject to any disclaimer, the term of this patent is extended or adjusted under 35 U.S.C. 154(b) by 223 days.

This patent is subject to a terminal disclaimer.

(21) Appl. No.: 14/338,082

(22) Filed: Jul. 22, 2014

(65) Prior Publication Data

US 2014/0337101 A1    Nov. 13, 2014

Related U.S. Application Data

(63) Continuation-in-part of application No. 13/837,684, filed on Mar. 15, 2013, now Pat. No. 8,954,343, and
(Continued)

(51) Int. Cl.
*G06Q 30/02* (2012.01)

(52) U.S. Cl.
CPC ............... *G06Q 30/0203* (2013.01)

(58) Field of Classification Search
CPC ...... G06Q 30/236; G06Q 10/06; G06Q 10/10; G06Q 10/063; G06Q 10/063112; G06Q 30/02
See application file for complete search history.

(56) References Cited

U.S. PATENT DOCUMENTS 6,655,963 B1 * 12/2003 Horvitz et al. .............. 434/236
7,342,583 B2 * 3/2008 Behar et al. ................. 345/440
(Continued)

FOREIGN PATENT DOCUMENTS

KR    2020023675 A  *  8/1918

OTHER PUBLICATIONS

Deaconu, M. (2010). Social Networks and Multimedia Content Analysis. Economics, Management and Financial Markets, 5(4), 208-213. Retrieved from https://search.proquest.com/docview/857667311?accountid=14753 (Year: 2010).*

*Primary Examiner* — Patricia H Munson
*Assistant Examiner* — Nancy N Prasad
(74) *Attorney, Agent, or Firm* — Larry J. Guffey, Esq.; Oliver & Grimsley, LLC (57) ABSTRACT

A web-page or customer interface, that enables a business to increase their customer satisfaction levels, etc. based on the business' improved capability to predict the wants and needs of their customers as a result of it using such an interface to assess the personalities of their customers, includes: (a) dichotomous, personality traits, (b) photographic images to which are assigned ranked dichotomous personality traits based on the psychological content of the respective photographic images, (c) an image viewer adapted to present to a customer these images so as to identify with which of these images the customer elects to be associated, (d) personality types into which a customer is categorized, and wherein each of these personality types is differentiated by the specific set of dichotomous, personality traits associated with it, and (e) an algorithm adapted to categorize one into a personality types.

8 Claims, 6 Drawing Sheets

Personality Traits Assigned:

Competitive

Physically Driven

Can Delay Gratification

Compulsive

Focused

Related U.S. Application Data a continuation-in-part of application No. 13/478,817, filed on May 23, 2012, now Pat. No. 8,788,307.

(56) References Cited

U.S. PATENT DOCUMENTS

| | | | |
|---|---|---|---|
| 7,454,357 B2* | 11/2008 | Buckwalter et al. | 705/346 |
| 7,536,439 B1 | 5/2009 | Jaladanki et al. | |
| 7,552,060 B2* | 6/2009 | Vest | 705/1.1 |
| 7,698,462 B2 | 4/2010 | McQuillen et al. | |
| 8,171,159 B2 | 5/2012 | McQuillen et al. | |
| 8,195,668 B2* | 6/2012 | Drennan et al. | 707/748 |
| 8,250,132 B2 | 8/2012 | Adreon et al. | |
| 8,341,101 B1* | 12/2012 | Treiser | 706/45 |
| 8,473,490 B2* | 6/2013 | Bonilla et al. | 707/732 |
| 2003/0204437 A1* | 10/2003 | Flender et al. | 705/10 |
| 2004/0162821 A1* | 8/2004 | Buckwalter | G06Q 30/02 |
| 2004/0210661 A1* | 10/2004 | Thompson | G06Q 30/02 709/228 |
| 2004/0260781 A1* | 12/2004 | Shostack et al. | 709/207 |
| 2005/0209909 A1* | 9/2005 | Dull et al. | 705/10 |
| 2006/0041480 A1* | 2/2006 | Briggs | 705/14 |
| 2006/0149614 A1* | 7/2006 | Suzuki et al. | 705/10 |
| 2006/0282306 A1* | 12/2006 | Thissen-Roe | 705/11 |
| 2007/0012325 A1* | 1/2007 | Greenwald | 128/898 |
| 2007/0053513 A1* | 3/2007 | Hoffberg | 380/201 |
| 2007/0078869 A1* | 4/2007 | Carr et al. | 707/100 |
| 2007/0192106 A1* | 8/2007 | Zilca | 704/270 |
| 2007/0282621 A1* | 12/2007 | Altman et al. | 705/1 |
| 2008/0126426 A1* | 5/2008 | Manas et al. | 707/104.1 |
| 2008/0263446 A1* | 10/2008 | Altberg et al. | 715/706 |
| 2010/0077032 A1* | 3/2010 | Drennan et al. | 709/206 |
| 2010/0145869 A1* | 6/2010 | Brown | 705/319 |
| 2010/0250477 A1 | 9/2010 | Yadav | |
| 2011/0029566 A1* | 2/2011 | Grandison et al. | 707/783 |
| 2012/0290978 A1* | 11/2012 | Devecka | G06Q 30/0277 715/810 |

\* cited by examiner

| Pairs of Representative Dichotomous Personality Traits 10 ||
|---|---|
| Aggressive--Passive | Extreme--Moderate |
| Agitated--Serene | Erratic--Steady |
| Alert--Inattentive | Impulsive--Inhibited |
| Altruistic--Self Serving | Funny--Serious |
| Analytical--cursory | Rigid--Flexible |
| Anxious--Calm | Goal-Oriented--Process-Oriented |
| Apathetic--Passionate | Loyal--Fickle |
| Attached--Detached | Self-Aware--Unconscious |
| Attention-Seeking--Private | Introspective--Externally-Focused |
| Attuned--Unattuned | Intuitive--Rational |
| Blunted--Expressive | Sensitive--Tough |
| Avoidant--Direct | Group-Oriented--Prefers One-on-One |
| Caring--Indifferent | Faithful--Unfaithful |
| Careless--Meticulous | Follower--Leader |
| Casual--Formal | Friendly--Unfriendly |
| Cautious--Daring | Future-Focused--Nostalgic |
| Charismatic--Dull | Heedless--Mindful |
| Open-Minded--Closed-Minded | High-Energy--Low-Energy |
| Cognitive--Emotional | Inorganic--Organic |
| Compassionate-- Unfeeling | Likes Familiarity--Likes Novelty |
| Competitive--Non-Competitive | Narcissistic--Thinks Beyond Oneself |
| Compulsive--Spontaneous | Oblivious--Vigilant |
| Concrete-- Imaginitive | Observant-- Unaware |
| Confident--Easily-Slighted | Optimistic--Pessimistic |
| Conventional--Unconventional | Particular--Easy-Going |
| Conversational--Quiet | Peaceful—Excitable |
| Creative--Uncreative | Perfectionistic--Reckless |
| Curious--Disinterested | Playful--Sober |
| Decisive--Indecisive | Practical--Whimsical |
| Deliberate--Instinctive | Progressive--Regressive |
| Dependent--Independent | Protective--Unprotective |
| Detail-Oriented--vague | Realistic--Unrealistic |
| Distractable--Focused | Regulated--Unregulated |
| Dominant--Submissive | Reserved--Sociable |
| Earthy--Urbane | Romantic--Unromantic |

FIG. 1(b)

| Representative List of the Subject Areas That Are Assessed |
|---|
| Communication Style |
| Money |
| Intimacy |
| Romance |
| Politics |
| Religion |
| Socializing |
| Body Clock |
| Logic vs Emotion |
| Introversion/Extraversion |
| Dealing With Conflict |
| Boundaries |
| Novelty Needs |
| Spontaneity |
| Creativity |
| Flexibility |
| Love Language |

FIG. 1(c)

| \multicolumn{7}{c}{Representative Personality Categories 14 and Their Associated Personality Traits 10} |
|---|---|---|---|---|---|---|
| Action-Taker | Planner | Visionary | Mentor | Inventor | Analyzer | Naturalist |
| Concrete<br><br>Physically Driven<br><br>Practical<br><br>Prefers Working Alone<br><br>Realistic<br><br>Goal Oriented<br><br>Direct<br><br>Stable | Alert<br><br>Decisive<br><br>Likes Familiarity<br><br>Meticulous<br><br>Particular<br><br>Detail Oriented<br><br>Conventional<br><br>Compulsive | Competitive<br><br>Confident<br><br>Leader<br><br>Outgoing<br><br>Visionary<br><br>Daring<br><br>Aggressive<br><br>High Energy | Altruistic<br><br>Empathic<br><br>Open Minded<br><br>Prefers Working With Others<br><br>Process Oriented<br><br>Sensitive<br><br>Loyal<br><br>Patient | Creative<br><br>Flexible<br><br>Intuitive<br><br>Passionate<br><br>Spontaneous<br><br>Likes novelty<br><br>Unconventional<br><br>Whimsical | Analytical<br><br>Deliberate<br><br>Intellectually Driven<br><br>Rational<br><br>Deep<br><br>Observant<br><br>Serious<br><br>Inquisitive | Earthy<br><br>Future Focused<br><br>Optimistic<br><br>Organic<br><br>Protective<br><br>Independent<br><br>Relaxed<br><br>Steady |

Personality Traits Assigned:

Competitive

Physically Driven

Can Delay Gratification

Compulsive

Focused

SYSTEM AND METHOD FOR BUSINESSES TO COLLECT PERSONALITY INFORMATION FROM THEIR CUSTOMERS

CROSS-REFERENCE TO RELATED APPLICATIONS

This a Continuation-In-Part patent application and claims the benefit of Provisional Patent Application No. 61/530,926, filed Sep. 2, 2011; Regular patent application Ser. No. 13/478,817, filed May 23, 2012, which issued as U.S. Pat. No. 8,788,307 on Jul. 22, 2014; Regular patent application Ser. No. 13/688,942, filed Nov. 29, 2012, and Regular patent application Ser. No. 13/837,684, filed Mar. 15, 2013, which issued as U.S. Pat. No. 8,954,343 on Feb. 10, 2015, and wherein all of the present inventors were joint inventors in these earlier applications. The teachings of these applications and patent are incorporated herein by reference to the extent that they do not conflict with the teaching herein.

BACKGROUND OF THE INVENTION

1. Field of the Invention

The present invention relates generally to data processing, including those related to business practices. Specifically, the present invention relates to a system and method that allows product and services providers to gain insight into the personalities of their customers for the purpose of better satisfying their wants and needs.

2. Description of the Related Art

Product and service providers are always striving to perform in such a manner as to better please their customers or clients (along with potential customers and clients, hereinafter, collectively referred to as "customers"). These improved customer satisfaction efforts can include various techniques that businesses use to strive to learn more about their individual customers—the theory being that "the better businesses know their customers, the better they can serve them."

These techniques for learning more about their customers can include the monitoring of customer or consumer behaviors and the keeping of a careful database of all the information that customers give to them or that the businesses assemble from outside information sources, including the answers to survey questions that many businesses will ask their customers to complete regarding the customers' level of satisfaction with a business' products/services, and its customer service activities.

Such techniques for learning more about a business' individual customers have historically not included any significant attempts to assess the individual personalities of their customers. The reasons for this situation are many. For example, an individual's personality is currently measured by traditional assessments such as the Myers-Briggs Type Indicator (MBTI) and Holland Themes personality inventories. These assessments, while generally regarded as accurate, are not easily translated into formats accessible through current non-textual, digital technology (mobile devices, tablets, etc.) because these assessment tools are text based and rely on the basic reading skills and comprehension levels of those being assessed.

Personality assessment information, assuming it could somehow be efficiently collected, would seemingly be of great value to businesses since it is widely accepted that a detailed knowledge of one's personality can, in many instances, be predictive of one's behavior in various situations, including the choices or preferences that one will exhibit in various retail or consumer situations.

It seems reasonable that if businesses had information on the personalities of their customers, such businesses could probably do a better job of developing for their customers those products and services that would be predicted to give them the most satisfaction. Thus, there is a need for new methods and systems that will enable businesses to efficiently assess the personalities of their customers.

SUMMARY OF THE INVENTION

Recognizing the need for the development of new methods and systems that will enable businesses to improve their customer satisfaction levels by efficiently assessing the personalities of their individual customers, the present invention is generally directed to satisfying this need.

According to the present invention, a personality-assessment interface, or a computer program product for use in conjunction with a computer device of the type having a processor and an image viewer, the computer program product comprising a computer readable, non-transitory, storage medium and instructions thereon, that enables a business to increase their customer satisfaction levels, sales, profits, etc. based on the business having achieved an improved capability to predict the wants and needs of their customers as a result of the business having used this personality-assessment interface to assess the personalities of their individual customers includes: (a) a plurality of dichotomous, personality traits, (b) a plurality of photographic images for viewing by a customer, wherein a plurality of these dichotomous personality traits are ranked and assigned to each of the plurality of photographic images based on the psychological content of the respective photographic image, whereby a customer who chooses to be associated with a particular one of the photographic images can from a psychological perspective be assessed to possess its assigned dichotomous personality traits, (c) an image viewer having a configuration adapted to present to a customer the plurality of photographic images so as to identify with which of these images the customer elects to be associated, (d) a plurality of personality types into which a customer is categorized based upon the temperament and behavior that is expected to be exhibited by a customer that is categorized into one of the plurality of personality types, (e) wherein each of these personality types is differentiated by the specific set of dichotomous, personality traits that is associated with each of the personality types, and (f) a first algorithm having a configuration adapted to, utilizing the photographic images with which the customer elects to be associated and the related plurality of identified dichotomous personality traits that are ranked and assigned to each of the photographic images, categorize a customer into one of the personality types.

Thus, there has been summarized above (rather broadly and understanding that there are other preferred embodiments which have not been summarized above) the present invention in order that the detailed description that follows may be better understood and appreciated.

BRIEF DESCRIPTION OF THE DRAWINGS

FIG. 1(a) provides a representative list of the dichotomous personality traits identified and used by the present invention.

DESCRIPTION OF THE PREFERRED EMBODIMENT

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

The present invention seeks to enable businesses to improve their customer satisfaction levels, sales, profits, etc. by exhibiting the ability to better predict the wants and needs of their customers as a result of having achieved a greater understanding of their customers via personality assessments of them. To understand better how a business can utilize personality assessments of their customers to improve its business results, consider the example of a website developer who is tasked with the assignment of improving the satisfaction levels of customers who interact with a business' website. Because of the knowledge of one's preferences that a personality assessment provides, the website developer can utilize this information to tailor the experiences that personality-assessed customers experience when they visit the website by providing them with customized content, recommendations, etc. based on a knowledge of their preferences.

The present invention provides a means that businesses can use to efficiently assess the personalities of their individual customers. Alternatively, the present invention can be considered to be a unique user or application programming interface that a business can use to improve their customers' levels of satisfaction with their products or services (hereinafter referred to collectively as "products").

The personality assessment techniques of the present invention differs from previous methods in that they rely on individuals' interactions and responses to photographic images. These images are tied to personality traits and types, which are combined to generate unique personality assessments for each user.

The present invention allows the developers of web content to embed into their applications a visual method of personality assessment that can be customized to suit the unique needs of the developer's company and its unique customer or user base. Each personality assessment generated by the present invention utilizes a specific number of images; each having an associated number of personality traits that are measured based on the user's response to the image. These traits can be grouped so as to characterize those assessed into different personality types (Inventor, Visionary, etc.).

The present invention 1 develops novel psychology-based profiles for the customers of a business that utilizes the present invention. These profiles contain a novel identification of a customer's personality traits 10. These personality traits 10 are based on the clinical knowledge that many personality traits are ubiquitous, and exist to varying degrees in each individual. Consequently, sets of dichotomous personality traits have been selected in order to measure the degree to which one who is being assessed with the present invention possesses distinct traits. Specific sets of these traits are considered to be predictive of an individual's behavior and preferences.

While individuals' behaviors can vary greatly, the inventors of the present invention maintain that, for the purposes of enabling a business to know how to optimally serve a customer, it is possible to classify people's behavior into certain general personality categories or types 12. Furthermore, the present invention maintains that each of these personality categories can be best understood or defined in terms of the personality traits 10 that are associated are ascribed to each of them.

For the purpose of enabling a business to know how to optimally serve a customer, the present invention seeks to assess people or customers so as to be able to categorize them into one of the herein defined personality categories. This assessment process involves the use of the present invention's unique customer interface.

Figure 1:
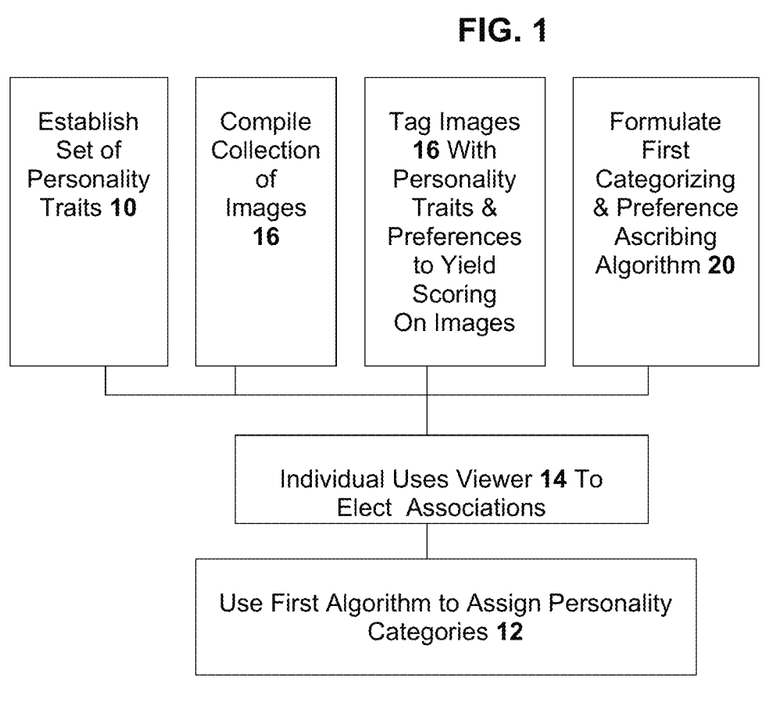
FIG. 1 is a flow diagram representation of a preferred embodiment of the present invention in the form of a method for enabling a business to increase their customer satisfaction levels, sales, profits, etc. based on the business having achieved an improved capability to predict the wants and needs of their customers as a result of the business having used this method to assess the personalities of their individual customers.

The process or method of the present invention, see FIG. 1, begins by a business or user of the present invention showing or giving one of their customers a tutorial overview of the steps in this invention's personality assessment process. A customer profile is then developed that entails a psychology-based, personality categorization of the customer that includes a specific set of personality traits 10 that is informative of how the customer is predicted to make selection decisions regarding various subjects, issues or topics.

The present invention invites a customer or potential customer (hereinafter "customer") to play with or utilize an image viewer 14 in order to allow the system to personality categorize the customer and to deduce or ascribe to the customer a specific set of preferences in various subject or issue areas based on the personality trait and preference data collected by utilizing the methodology of the present invention. This image viewer or interface 14 or personality assessment or association tool is configured to direct a customer to select "me (i.e., the customer associates him/her-self with the image)" or "not me" as he/she views the image viewer (e.g., a business user's website that provides this assessment tool and wherein the customer uses his/her computer device (e.g., desktop computer, mobile device or personal digital assistant that has a video screen and a processor or data processing capabilities) to access the internet and the business' website) or carousel of these photographic images (i.e., reproductions of what a human eye sees) 16.

Figure 1B:
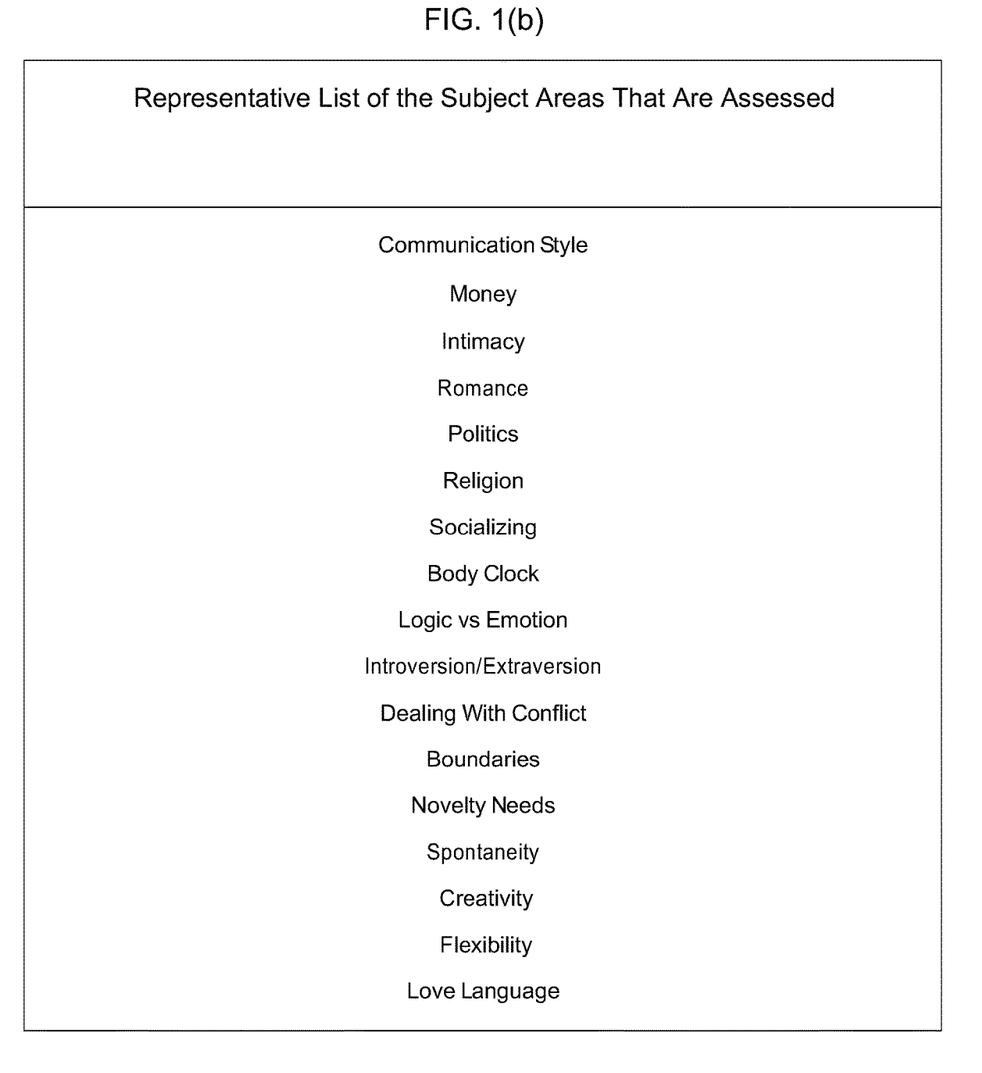
FIG. 1(b) provides a representative list of representative subject or issue areas that are assessed by the present invention and where one's preferences in these are used to guide the customer service, etc. decisions of a business that is utilizing the present invention.

Unbeknownst to the viewer, these images have ranking or scoring 18 for personality traits in various subject, issue or topic areas associated with each image—i.e., personality traits and preferences in various subject areas are ascribed to each of the images according to whether one who possesses a specific personality trait would be psychologically predicted, upon considering one of the images, to associate himself or herself with the considered image. See FIG. 1(a) and FIG. 1(b) for representative lists of the personality traits and various subject, issue or topic areas that are assessed by the present invention.

A preferred embodiment of traits for the present invention is a set of at least forty, and more preferably ninety five pairs of key traits, where each positive trait has a corresponding negative trait (e.g., passion vs. apathy), thus, there can be one hundred and ninety total traits. Other empirically tested personality indexes, such as The "Meyers-Briggs Type Indicator," also measure dichotomous traits resulting in sixteen possible outcomes/variables. The forty seven pairs of dichotomous traits in the present invention can result in a considerably more definitive psychological assessment of an individual than that which can be obtained using Meyers-Briggs indicators.

For example, an initial set of images 16 could consist of at least fifty and, more preferably, one hundred images designed to measure and collect data on a customer's personality in various subject areas—including preferred communication style, career interests, preferences for travel, recreational activities and hobbies, etc.

Figure 1C:
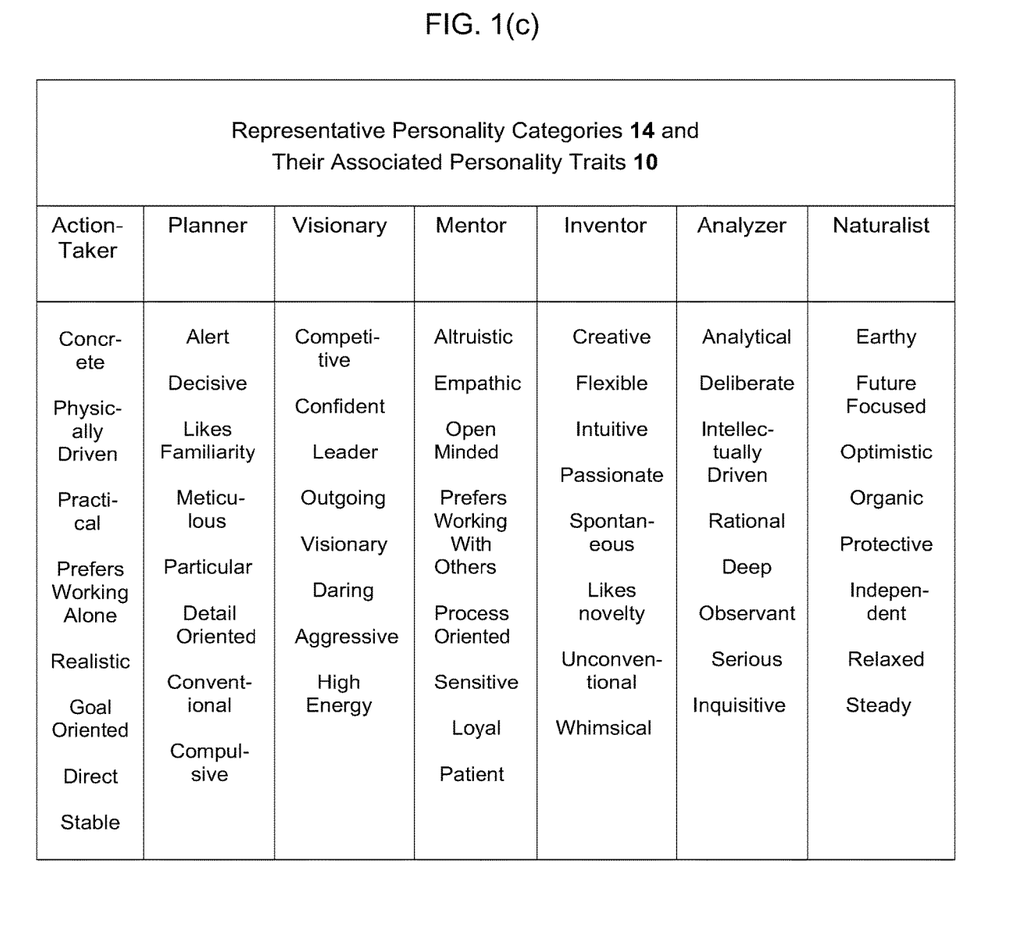
FIG. 1(c) provides a representative listing of personality categories that could be used by the present invention and the personality traits associated with each of them.

Each of these images 16 will usually have five to ten, ranked personality traits 10 assigned to or "scored to" or "tagged to" it. Images 16 to which said ranked personality traits 10 have been assigned or scored or tagged may then be referred to herein as "personality-trait-tagged, photographic images." With every "me" or "not me" response to each image, personality trait data is collected that will eventually lead to the categorization of the individual into one of a plurality of personality categories 12. See FIG. 1(c) for a representative listing of such personality categories 12 and the personality traits 10 associated with each of them.

Utilizing this "scoring" 18 or "means for scoring for ascribing personality traits and preferences to the images," the sum of a customer's associations with the images is used by a first algorithm 20 or algorithmic process of the present invention to yield an identification of a set of personality traits and preferences that best characterizes or categorizes the customer's personality and preferences on various subject matters. There are many relatively simple, well-known algorithms that can perform this function (e.g., define the categorization of one's personality in terms of set of personality traits that were most often "selected" or "not selected" in responding "me" or "not me" to the images the customer viewed and to which were scored various personality traits).

For example, with regard to categorizing one's personality, if we have 100 images that are each scored with 7 personality traits, a user will, in viewing and responding "me" or "not me" to these images, be effectively making 700 personality trait selections. If there are only 50 pairs of personality traits, the average number that any trait would be selected is 7. However, some of the traits could unknowingly be selected 35 or more times while others are selected only 2 to 3 times. Rank ordering these traits in terms of how many times they were selected will give one a simple criteria or first algorithm for identifying a set of personality traits that best characterizes or categorizes the customer's personality.

Since there are many, well-known algorithmic processes or algorithms that can distinguish between the alternative personality categories into one may be categorized and also discern an individual's preferences, these algorithmic processes will not be discussed further herein. All such well known, first algorithmic processes are considered to come within the scope of the present invention.

After the completion of this initial image viewing or slider assessment, a customer's personality is usually found to be best or most accurately characterized by not just one specific personality category 12, but by a blend of such categories. For example, assume the present invention is operating with seven defined personality categories, A-G. In this instance, it would be possible to categorize a customer who is being evaluated as being categorized into a category that is a blend of the seven categories—this could be quantified by defining the % to which a customer's personality is assessed to lie in each of the seven categories, and wherein the sum of these seven percentages equals 100%. Research using the present invention has often shown that it is usually only necessary to use two, of an available seven or more, categories to adequately characterize the personality of most individuals.

Figure 2:
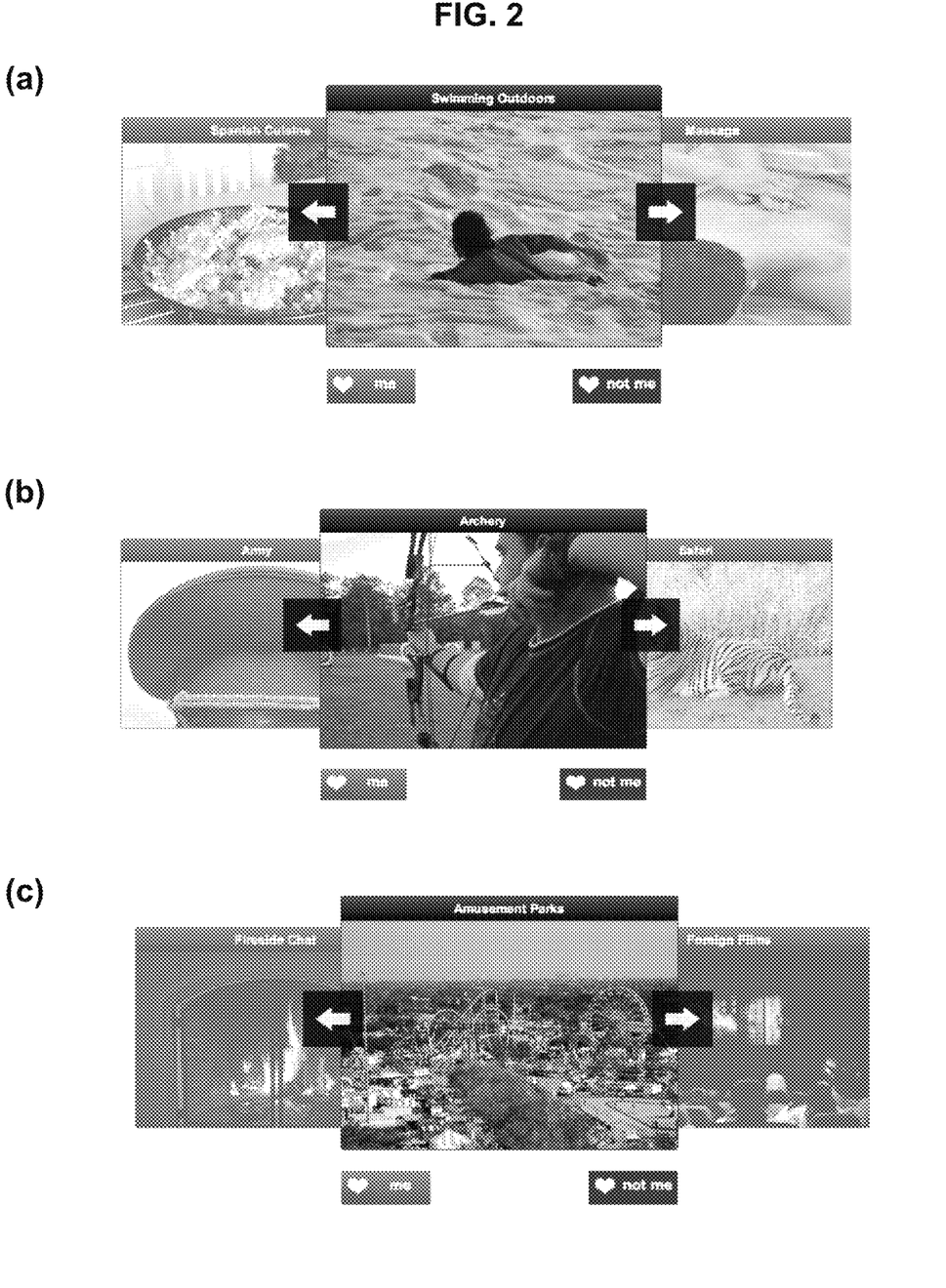
FIGS. 2(a)-2(c) provide representative images which could be used by the present invention.

The carousel of images 16 of the present invention is a unique application of existing technology to improve the classic personality assessment process. This carousel is unique itself. In a preferred embodiment, it is a customer interface by which a series of pre-defined but randomly selected images are displayed such that: (i) a user utilizes an input device, such as a mouse or a finger on a touch screen, to go forward or back in the array of images, and (iii) with each image, the user selects (or deselects) whether such image is representative of that person's likes or dislikes by selecting "me" or "not me." See FIGS. 2(a)-2(c).

Each image 16 may also have a written or spoken title or another communication means (e.g., a recording image of music or other types of sound, or both a written and verbal message) affixed to or associated with it. This means or message seeks to help to clarify for the customer the nature of the image and the activity, experience, quality, etc. which the viewing or consideration of the image is attempting to determine whether the customer "will" or "will not" elect to be associated with the image.

The present invention can potentially establishes a dynamic new relationship between a business and its customers. By determining their customers' personality traits 10 in various subject areas (e.g., hobbies, outside interests, recreational activities), the communications platform of the present invention can serve as an improved means for enabling a business to better serve their customers.

The present invention 1 can also be considered as a turnkey inquiry system that enables businesses to better serve their customers based on their assessments of their customers' personality traits and preferences in various subject areas. It is configurable in such a way that it is available both as a mobile application on any smart phone and as an online web application.

It should be noted that the tagging or scoring aspect of the present invention is unique in that these personality traits and preferences are not disclosed to the customer. The benefit of this is that a customer cannot in any way bias this identification of his/her personality traits.

The system of the present invention can be implemented using a number of technologies. These include the use of various webpages on a website, cloud-based service platform, mobile application, software service or similar communication means that is maintained to publicize a business's use of the present invention. Special software applications of the present invention can be created to run on various computing devices (e.g., smart phones) that can be used by the present invention in providing its service of enabling a business to assess the personalities of their customers. Mobile platforms prove to be especially effective for utilizing the unique interface of the present invention because they end up providing faster assessments of customers' personalities.

To implement the present invention, there are certain key background steps or tasks that must be accomplished, these include:

(a) identifying a plurality of personality categories or types 12 into which an individual may be categorized based upon the temperament and behavior that is predicted for the individual, (b) identifying and establishing a set of personality traits 10 that are configured such that a specific set of these personality traits categorizes an individual into one of the plurality of personality categories and are predictive of how an individual who possesses a subset of these personality traits is most likely to behave in different situations and make selection decisions as they relate to choosing between an array of available experiences, etc.

Figure 3:
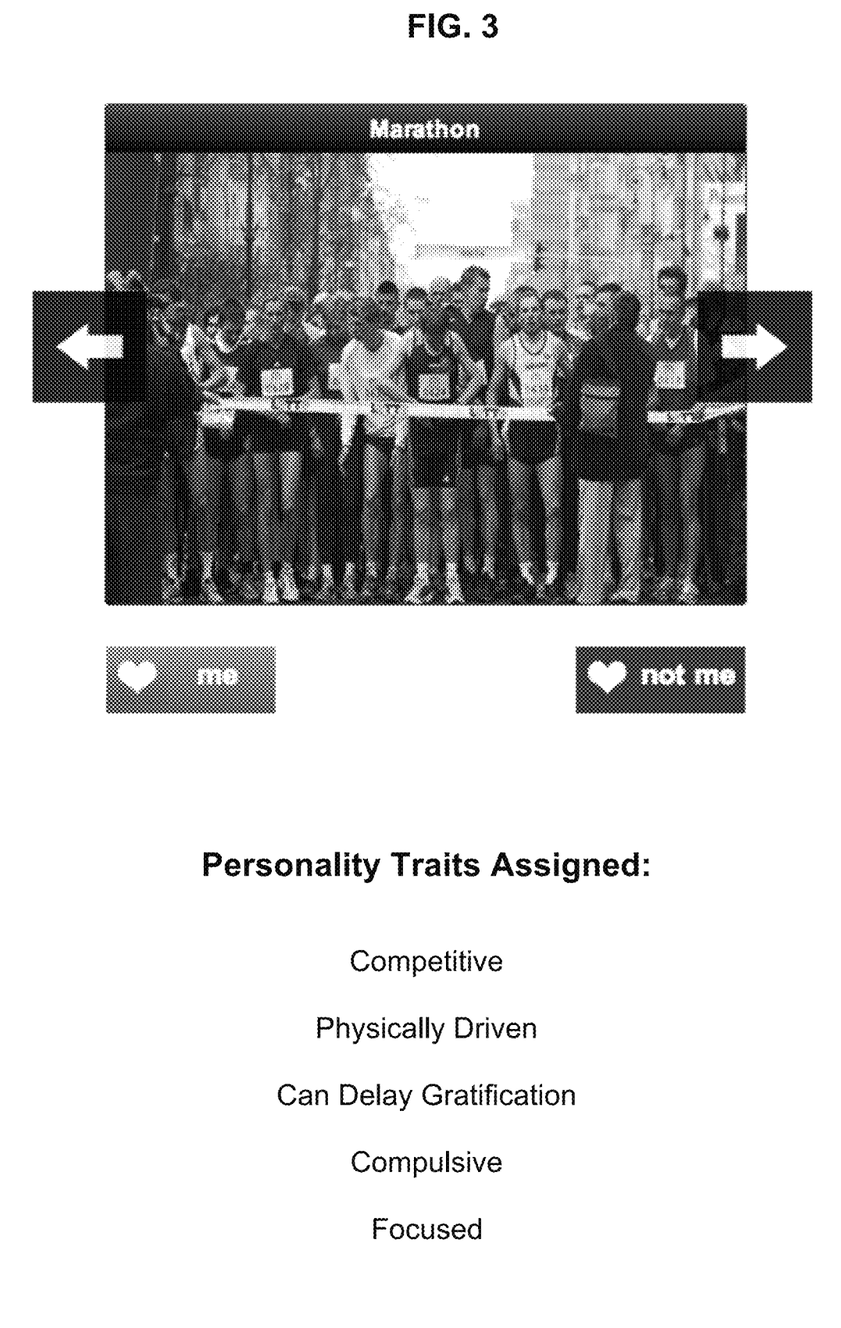
FIG. 3 provides an example of an image to which has been applied the personality trait scoring or assignment process of the present invention.

(c) compiling a collection of images 12 that are representative of an array of experiences; note that the use of the term images should be given its broadest definition so as to include not just static, visual images, but also videos that may or may not have sound and even recording images of music and other types of sound or writings joined to these images, (d) scoring each of these images 12 by assigning to each ranked personality trait and preference in various subject areas based, from a psychological viewpoint, on whether a user viewing the image would or would not be likely to identify with or to elect to participate-in the experience or activity represented in the image. See FIG. 3 for an example of an image to which has been applied personality trait scoring, (e) providing a means or image viewer or user interface 14 for an individual to view these images and identify with which of these images the customer elects to be associated, and then establishing, based upon the customer's identified associations and the scoring of the images, personality traits in various subject areas for the customer, and (f) identifying a first algorithm that is configured to utilize these elected associations of an individual to categorize the individual into one of the personality categories established and defined by the present invention.

In seeking to obtain the most informative and accurate personality assessments, it often proves useful to ask a customer to view more than the initial set of images. For example, in assessing a customer's preferences in various subject areas, image packets or slider presentations have been developed which are especially configured to assess and measure what a customer is looking for in a particular type of product.

The foregoing is considered as illustrative only of the principles of the present invention. Further, since numerous modifications and changes will readily occur to those skilled in the art, it is not desired to limit the invention to the exact construction and operation shown and described herein. Accordingly, all suitable modifications and equivalents may be resorted to, falling within the scope of the invention that are set forth in the claims to the invention.

We claim:

1. A user interface for use on the display of a computer device for use in the customer service industry to enable a business that uses said interface to increase their customer satisfaction levels, said user interface comprising:

a plurality of photographic images having an assigned plurality of personality traits that are assigned based on the psychological content of the respective image, a first portion of said user interface that is adapted to display an image from said plurality of photographic images on said display for viewing by a customer of said business, a second portion of said user interface that is adapted for use by said customer to identify whether said customer chooses to be associated with said photographic image that is displayed in said first portion, wherein said assigned plurality of personality traits are adapted such that a plurality of said personality traits are ranked and assigned to each of said plurality of photographic images based on the psychological content of the respective photographic image, whereby said customer who chooses to be associated with a particular one of said plurality of photographic images can from a psychological perspective be assessed to possess said assigned plurality of said personality traits, a plurality of personality types into which a customer is categorized based upon the wants-and-needs behavior that is expected to be exhibited by said customer that is categorized into one of said plurality of personality types, an algorithm having a configuration adapted to, utilizing said photographic images with which said customer chooses to be associated and the related plurality of said personality traits that are ranked and assigned to each of said photographic images, categorize said customer into one of said plurality of personality types, wherein said categorization into one of said plurality of personality types is adapted to yield for said business an improved capability to predict the wants and needs of the customers of said business, wherein said user interface is further adapted so that said assigned plurality of personality traits are not shown on said display to said customer, wherein said plurality of photographic images are adapted to be viewed in an array of images, wherein said first portion of said user interface including a first indicia that is adapted to be used by said customer to go forward in said array of images and a second indicia that is adapted to be used by said customer to go backward in said array of images, and wherein said second portion of said user interface including a third indicia that is adapted to be used by said customer to indicate that said customer chooses to be associated with said photographic image that is displayed in said first portion, and a fourth indicia that is adapted to be used by said customer to indicate that said customer chooses to not be associated with said photographic image that is displayed in said first portion.

2. The user interface as recited in claim 1, wherein: said plurality of personality traits includes at least forty pairs of dichotomous personality traits.

3. A method that utilizes a user interface on the display of a computer device for use in the customer service industry to enable a business that uses said method to increase their customer satisfaction levels, said method comprising the steps of:

providing a plurality of photographic images having an assigned plurality of personality traits that are assigned based on the psychological content of the respective image, providing said user interface with a first portion that is adapted to display an image from said plurality of photographic images on said display for viewing by a customer of said business, providing said user interface with a second portion that is adapted for use by said customer to identify whether said customer chooses to be associated with said photographic image that is displayed in said first portion, wherein said assigned plurality of personality traits are adapted such that a plurality of said personality traits are ranked and assigned to each of said plurality of photographic images based on the psychological content of the respective photographic image, whereby said customer who chooses to be associated with a particular one of said plurality of photographic images can from a psychological perspective be assessed to possess said assigned plurality of said personality traits, providing a plurality of personality types into which a customer is categorized based upon the wants-and-needs behavior that is expected to be exhibited by said customer that is categorized into one of said plurality of personality types, providing an algorithm having a configuration adapted to, utilizing said photographic images with which said customer chooses to be associated and the related plurality of said personality traits that are ranked and assigned to each of said photographic images, categorize said customer into one of said plurality of personality types, wherein said categorization into one of said plurality of personality types is adapted to yield for said business an improved capability to predict the wants and needs of the customers of said business, wherein said user interface is further adapted so that said assigned plurality of personality traits are not shown on said display to said customer, wherein said plurality of photographic images are adapted to be viewed in an array of images, wherein said first portion of said user interface including a first indicia that is adapted to be used by said customer to go forward in said array of images and a second indicia that is adapted to be used by said customer to go backward in said array of images, and wherein said second portion of said user interface including a third indicia that is adapted to be used by said customer to indicate that said customer chooses to be associated with said photographic image that is displayed in said first portion, and a fourth indicia that is adapted to be used by said customer to indicate that said customer chooses to not be associated with said photographic image that is displayed in said first portion.

4. The method as recited in claim 3, wherein:
said plurality of personality traits includes at least forty pairs of dichotomous personality traits.

5. The method as recited in claim 3, wherein:
said plurality of personality traits includes at least ninety five pairs of personality traits.

6. A computer readable, non-transitory, storage medium and program code recorded thereon, for execution on a computer device which has a display with a user interface, and is used in the customer service industry to enable a business that uses said computer readable medium to increase their customer satisfaction levels, said program code causing said computer device to perform the following method steps of:

providing a plurality of photographic images having an assigned plurality of personality traits that are assigned based on the psychological content of the respective image, providing said user interface with a first portion that is adapted to display an image from said plurality of photographic images for viewing on said display by a customer of said business, providing said user interface with a second portion that is adapted for use viewing by a customer of said business and allows said customer to identify whether said customer chooses to be associated with said photographic image that is displayed in said first portion, wherein said assigned plurality of personality traits are adapted such that a plurality of said personality traits are ranked and assigned to each of said plurality of photographic images based on the psychological content of the respective photographic image, whereby said customer who chooses to be associated with a particular one of said plurality of photographic images can from a psychological perspective be assessed to possess said assigned plurality of said personality traits, providing a plurality of personality types into which a customer is categorized based upon the wants-and-needs behavior that is expected to be exhibited by said customer that is categorized into one of said plurality of personality types, providing an algorithm having a configuration adapted to, utilizing said photographic images with which said customer chooses to be associated and the related plurality of said personality traits that are ranked and assigned to each of said photographic images, categorize said customer into one of said plurality of personality types, wherein said categorization into one of said plurality of personality types is adapted to yield for said business an improved capability to predict the wants and needs of the customers of said business, wherein said user interface is further adapted so that said assigned plurality of personality traits are not shown on said display to said customer, wherein said plurality of photographic images are adapted to be viewed in an array of images, wherein said first portion of said user interface including a first indicia that is adapted to be used by said customer to go forward in said array of images and a second indicia that is adapted to be used by said customer to go backward in said array of images, and wherein said second portion of said user interface including a third indicia that is adapted to be used by said customer to indicate that said customer chooses to be associated with said photographic image that is displayed in said first portion, and a fourth indicia that is adapted to be used by said customer to indicate that said customer chooses to not be associated with said photographic image that is displayed in said first portion.

7. The computer readable, non-transitory, storage medium and program code recorded thereon as recited in claim 6, wherein:
said plurality of personality traits includes at least forty pairs of dichotomous personality traits.

8. The computer readable, non-transitory, storage medium and program code recorded thereon as recited in claim 6, wherein:
said plurality of personality traits includes at least ninety five pairs of dichotomous personality traits.

* * * * *